(12) United States Patent
Couasnon

(10) Patent No.: US 9,199,556 B2
(45) Date of Patent: Dec. 1, 2015

(54) HINGE ASSEMBLY FOR VEHICLE SEAT AND VEHICLE SEAT COMPRISING SUCH A HINGE ASSEMBLY

(75) Inventor: Christian Couasnon, Flers (FR)

(73) Assignee: Faurecia Sièges D'Automobile, Nanterre (FR)

( * ) Notice: Subject to any disclaimer, the term of this patent is extended or adjusted under 35 U.S.C. 154(b) by 354 days.

(21) Appl. No.: 13/457,904

(22) Filed: Apr. 27, 2012

(65) Prior Publication Data

US 2012/0286556 A1 Nov. 15, 2012

(30) Foreign Application Priority Data

May 11, 2011 (FR) ...................... 11 54058

(51) Int. Cl.
*B60N 2/22* (2006.01)
*B60N 2/225* (2006.01)
*B60N 2/20* (2006.01)

(52) U.S. Cl.
CPC ....... *B60N 2/225* (2013.01); *B60N 2/20* (2013.01); *B60N 2/2245* (2013.01)

(58) Field of Classification Search
CPC ......... B60N 2/2245; B60N 2/225; B60N 2/20
USPC ................................. 297/378.12
See application file for complete search history.

(56) References Cited

U.S. PATENT DOCUMENTS

| 7,328,954 B2* | 2/2008 | Sasaki et al. ............. 297/378.12 |
| 7,871,128 B2* | 1/2011 | Bonk et al. .............. 297/378.12 |
| 8,491,054 B2* | 7/2013 | Myers et al. ......... 297/378.12 X |
| 2005/0231015 A1 | 10/2005 | Wilkening |

FOREIGN PATENT DOCUMENTS

| DE | 10206303 A1 | 8/2003 |
| EP | 1302361 A1 | 4/2003 |
| EP | 1334866 | 10/2004 |
| EP | 1518744 A1 | 3/2005 |
| FR | 2888173 A1 | 1/2007 |
| WO | WO 2005/032879 A1 | 4/2005 |
| WO | WO 2005032879 A1 | 4/2005 |

OTHER PUBLICATIONS

French Search Report from corresponding French Patent Application No. FR 1154058 Report Dated Nov. 25, 2011.

* cited by examiner

*Primary Examiner* — Anthony D Barfield
(74) *Attorney, Agent, or Firm* — Miller, Matthias & Hull LLP

(57) ABSTRACT

A hinge assembly for vehicle seat, comprising first, second, and third frames assembled to pivot, a hinge mechanism for adjusting an angular usage position of the first frame relative to the third frame, a first lock to immobilize the first frame relative to the third frame in said usage position, and a first control device for releasing the first lock is disclosed. It also comprises a second lock to immobilize the first frame relative to the second frame in a tilted position, a stop to immobilize the first frame in the tilted position, and a second control device for releasing the second lock.

8 Claims, 10 Drawing Sheets

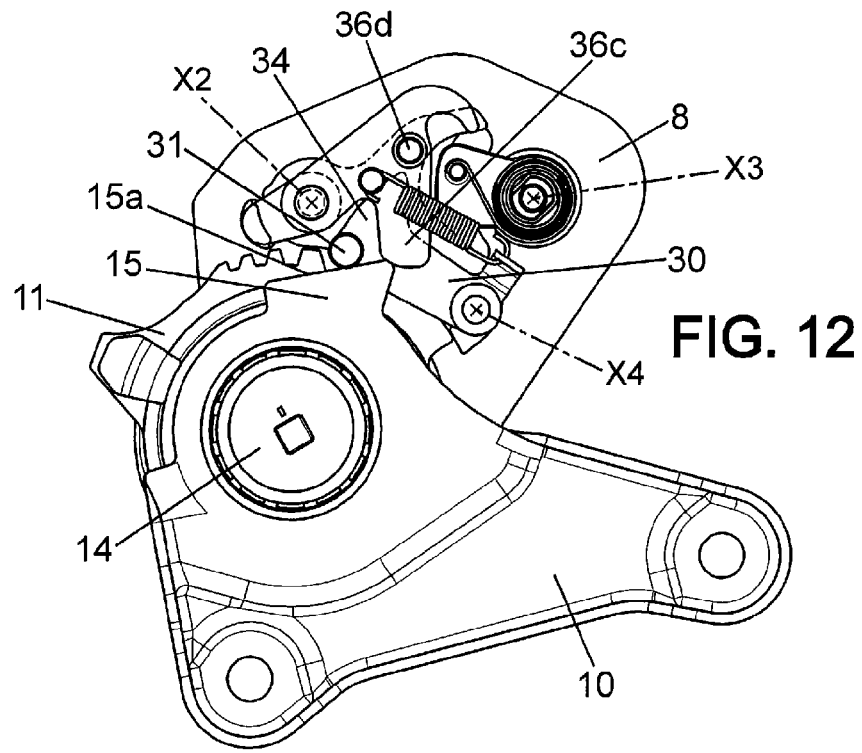
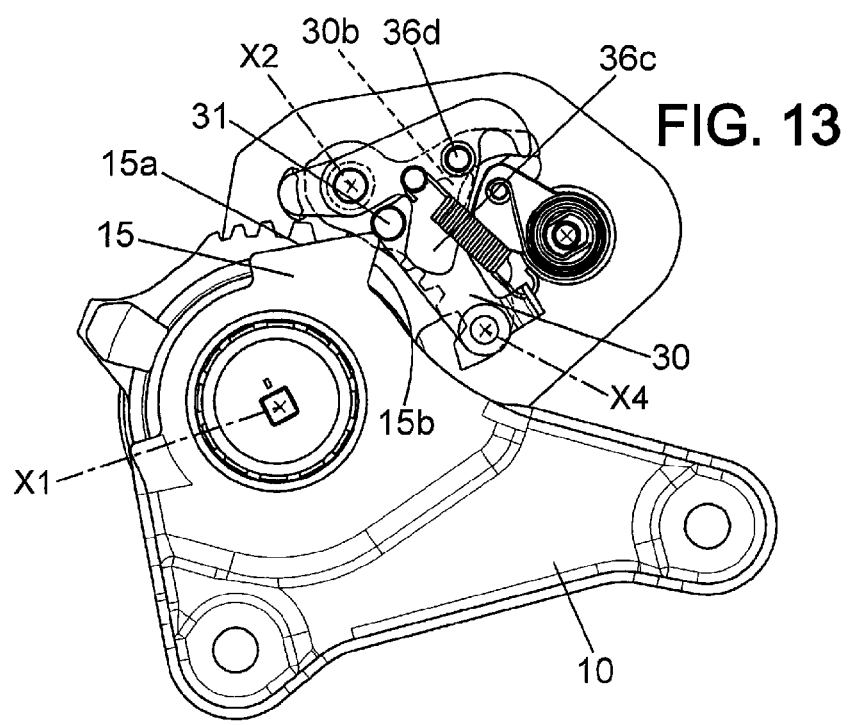

HINGE ASSEMBLY FOR VEHICLE SEAT AND VEHICLE SEAT COMPRISING SUCH A HINGE ASSEMBLY

CROSS-REFERENCE TO RELATED APPLICATIONS

This application claims priority under 35 USC §119 and the Paris Convention to French Patent Application No. FR 11 54058, filed on May 11, 2011.

FIELD OF THE INVENTION DISCLOSURE

The invention relates to motor vehicle seats comprising a backrest which can be tilted forward.

BACKGROUND OF THE DISCLOSURE

It more particularly concerns a hinge assembly for a vehicle seat, comprising:
  first, second, and third frames assembled to pivot relative to each other on a first axis,
  a hinge mechanism connecting the first and third frames, said hinge mechanism being adapted to adjust an angular usage position of the first frame relative to the third frame,
  a first lock assembled on the first frame to move between a locked position, in which said first lock immobilizes the first frame relative to the third frame in said usage position, and an unlocked position, in which said first lock allows the first frame to pivot relative to the third frame,
  a first control device adapted to move the first lock between said locked position and said unlocked position.

Document FR-A-2 888 173 describes an example of a known hinge assembly and seat of this type.

The aim of the invention is to improve motor vehicle seats of this type, particularly to enable locking the backrest in the forward tilted position.

SUMMARY OF THE INVENTION DISCLOSURE

For this purpose, in the invention, a motor vehicle seat of the above type comprises a hinge assembly wherein said hinge assembly additionally comprises:
  a second lock assembled on the first frame to move between a locked position, in which said second lock immobilizes the first frame relative to the second frame in a forward tilted position, by contact between a stop that is part of the second frame and a stop element that is part of the second lock, and an unlocked position, in which said second lock allows the first frame to pivot relative to the second frame,
  a second control device adapted to move the second lock between said locked position and said unlocked position,
and wherein the first control device is adapted to cooperate with:
  the first lock, over a first movement portion of the first control device starting from the initial locking position of said first control device, to unlock the first lock, and
  the second control device, over a second movement portion following said first movement portion, to unlock the second lock.

With these arrangements, the hinge assembly allows locking a backrest in the forward tilted position, independently of the usage position of the first frame, a usage position which is adjusted by the hinge mechanism between the second frame and the third frame.

In addition, the first and second locking mechanisms are integrated into a single hinge assembly. Such a hinge assembly can easily be installed in place of another hinge assembly that does not contain the second locking mechanism for locking the backrest in the tilted position. This replacement is possible without modifying the other seat elements, and in particular without modifying the position of the control cable and without modifying the second frame. The other seat elements are then common to many versions of said seat and their cost can be reduced.

In various embodiments of the hinge assembly of the invention, one or more of the following arrangements may be used.

In one aspect of the invention, the first and second locks and the first and second control devices are adjacent to an upper portion of the first frame, said upper portion extending substantially along a central plane perpendicular to the first axis, out to a distance from said first axis that is greater than the outside diameter of the hinge mechanism.

In one aspect of the invention, the first and second locks and the first and second control devices do not extend more than 10 mm in the direction of the first axis relative to the central plane.

In one aspect of the invention, the stop comprises:
  a first surface adapted to come into contact with the stop element when the first frame is moved from the usage position to the tilted position, said first surface being angled relative to a radial direction from the first axis in order to raise the second lock above said stop during said movement into the tilted position, and
  a second surface adapted to come into contact with the stop element at a first contact point, to immobilize the second lock in the locking position when the first frame is in the tilted position.

In one aspect of the invention, the second surface of the stop extends in a radial direction from the first axis to immobilize the second lock in the locking position when the first frame is in the tilted position.

In one aspect of the invention, the assembly is such that:
  the second lock comprises a stop portion extending radially outward relative to the first axis,
  the second control device comprises an end stop adapted to cooperate with the stop portion by contact at a second contact point between said end stop and said stop portion, and
  the stop and the end stop are adapted to immobilize the second lock in the locking position when the first frame is in the tilted position.

In one aspect of the invention, in the locking position, a first reaction direction perpendicular to the second surface at the first contact point between the stop and the second lock, and a lock direction extending between the stop element and an axis of rotation of the second lock, form an angle greater than a limit angle ($\epsilon$), said limit angle corresponding to the angle of friction between the second lock and the second control device.

In one aspect of the invention, the angle ($\gamma$) between the first reaction direction and the lock direction is less than another limit angle, the other limit angle being less than the limit angle plus 10 degrees, and preferably being less than the limit angle plus 5 degrees.

The invention also relates to a motor vehicle seat comprising a seat base and a backrest connected to each other by at least one hinge assembly as defined above, one of the first and second frames being connected to the backrest and the other to the seat base.

BRIEF DESCRIPTION OF THE DRAWINGS

Other features and advantages of the invention will be apparent from the following description of two of its embodiments, provided as non-limiting examples, with reference to the attached drawings.

In the drawings:

FIG. 9a is an enlarged view of the second lock of FIG. 9, represented from another direction to show the elements hidden in FIG. 9, FIG. 12 is another side view of the assembly of FIG. 9, in which the first frame is represented with dotted lines to provide a better view of the elements of the assembly, the elements of the assembly being in different positions to show the movement and interactions between these elements, FIG. 13 is another side view of the assembly of FIG. 9, in which the first frame is represented with dotted lines to provide a better view of the elements of the assembly, the elements of the assembly being in different positions to show the movement and interactions between these elements.

DETAILED DESCRIPTION OF THE DISCLOSURE

The same references are used to denote identical or similar elements in the various figures.

Figure 1:
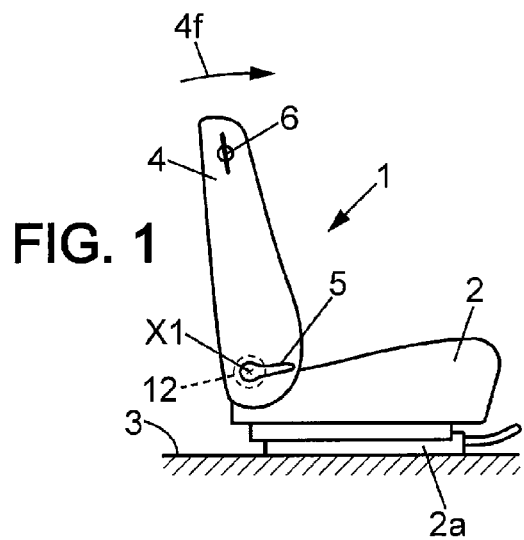
FIG. 1 is a schematic view of a vehicle seat which can be equipped with a hinge assembly according to one embodiment of the invention.

FIG. 1 represents a vehicle seat 1 comprising a seat base 2 mounted on the floor 3 of the vehicle and a backrest 4 mounted on the seat base in a manner allowing it to pivot on an axis X1.

The seat 1 may be equipped with a handle 5, or with any other control device allowing a user to adjust the angle of the backrest 4 by pivoting it on the pivot axis X1 into a usage position. In addition, the backrest 4 may additionally comprise a control lever 6 or some other actuating member, arranged for example on the upper part of the backrest, allowing a user to tilt the backrest 4 over a relatively wide pivot range into a forward tilted position, if necessary unlocking any rails 2a which may connect the seat base 2 to the floor 3 of the vehicle. In this case, actuating the lever 6 can, for example, allow the user to access the rear seating in a two-door vehicle, or more generally can provide easier access to the space located behind the seat 1.

FIGS. 2 to 8 show a first embodiment of a pivoting hinge assembly 7 of the invention, adapted to equip the seat 1 of FIG. 1. This hinge assembly 7 is represented in a side view of the usage position in FIG. 3 and in the exploded perspective view in FIG. 2, and may comprise for example:
- a first frame 8, for example in the form of a plate of sheet metal which primarily extends perpendicularly to the pivot axis X1 and which may be for example part of the frame of the backrest 4 (or more generally be connected to the backrest),
- a cover plate 9, which may also be made of sheet metal and extend parallel to the first frame 8, said cover plate 9 being for example welded to the first frame 8,
- a second frame 10, which may for example be in the form of a plate of sheet metal extending perpendicularly to the pivot axis X1 and which for example may be part of the frame of the seat base 2 (or more generally be connected to the seat base),
- a third frame 11 which is between the first frame 8 and the second frame 10, being for example in the form of a plate of sheet metal which primarily extends perpendicularly to the pivot axis X1.

This third frame 11 has a recess delimited by an inner edge 11a and a shoulder 11b delimiting a circular outer edge 11e which rotates in a circular opening of the first frame 8, to enable a relative rotation between the first and third frames 8, 11 around the pivot axis X1.

The third frame 11 is connected to the second frame 10, the latter being part of the seat base 2, by means of a hinge mechanism 14.

The hinge mechanism 14, which is known, is adapted to allow adjusting the angle of the backrest by pivoting on the axis X1 when the handle 5 is actuated. An example of a hinge mechanism usable in the context of the invention is provided in document FR-A-2 740 406. The hinge mechanism 14 may be stepped (adjusts the tilt to a predetermined number of angles) or continuous (adjusts the tilt over an entire angle range).

In FIGS. 3 to 8, the first frame 8 is represented with a dotted line to show more clearly the internal elements situated between the first frame 8 and the cover plate 9.

The first and third frames 8, 11 are connected to each other by a first locking mechanism 16 adapted to selectively affix these two frames together in a usage position of the first frame 8 and the backrest 2, or to allow relative pivoting of these two frames around the pivot axis X1 from this usage position to a tilted position.

The first locking mechanism 16 may comprise, for example, a first lock 20 which may be in the form of a plate cut from sheet metal, parallel to the frames 8, 10 and extending between two ends 20a, 20b.

Near its end 20a, the first lock 20 may comprise for example pivot pins 20c mounted on the first frame 8 and the cover plate 9 so as to pivot on an axis of rotation X2 parallel to the axis X1. The first lock 20 is thus mounted so as to pivot, relative to the first frame 8, on said axis of rotation X2.

Near its second end 20b, the first lock 20 additionally comprises teeth 21a, 21b, and 21c directed towards the third frame 11 and adapted to enter respective notches 12 denoted 12a, 12b, and 12c, arranged in the outer edge of this third frame 11, so as to integrally attach the first and second frames 8, 11 to each other in a usage position.

The first lock 20 is normally held in the locked position by a first control device 26 that is in the form of a cam, said first control device 26 being assembled to rotate on an axis of rotation X3 parallel to the axes X1 and X2, and positioned in the same plane as the first lock 20.

The first control device 26 may comprise, for example, pivot pins 26a mounted so as to pivot in corresponding recesses in the first frame 8 and the cover plate 9. It is forced by a spring 27 towards a rest position, in which it presses on a supporting edge 22 of the first lock 20 opposite the teeth 21a, 21b, 21c, such that said first control device 26 naturally actuates the first lock 20 into its locking position when it is facing the teeth of the third frame 11.

The spring 27 is, for example, a spring coiled around the axis X3 and having one end fixed to the first frame 8 (for example on the pivot pin 26a) and the other end acting on a first lever 28 integrally attached to the first control device 26 and offset relative to the axis X3.

The first lever 28 (or another lever integrally attached to the first control device) may also be fixed for example to an end of a first cable 6a connected to the control lever 6 for the seat, in a manner that causes the first control device 26 to pivot in the direction of the arrow 26f when the first lever 28 is actuated.

Figure 4:
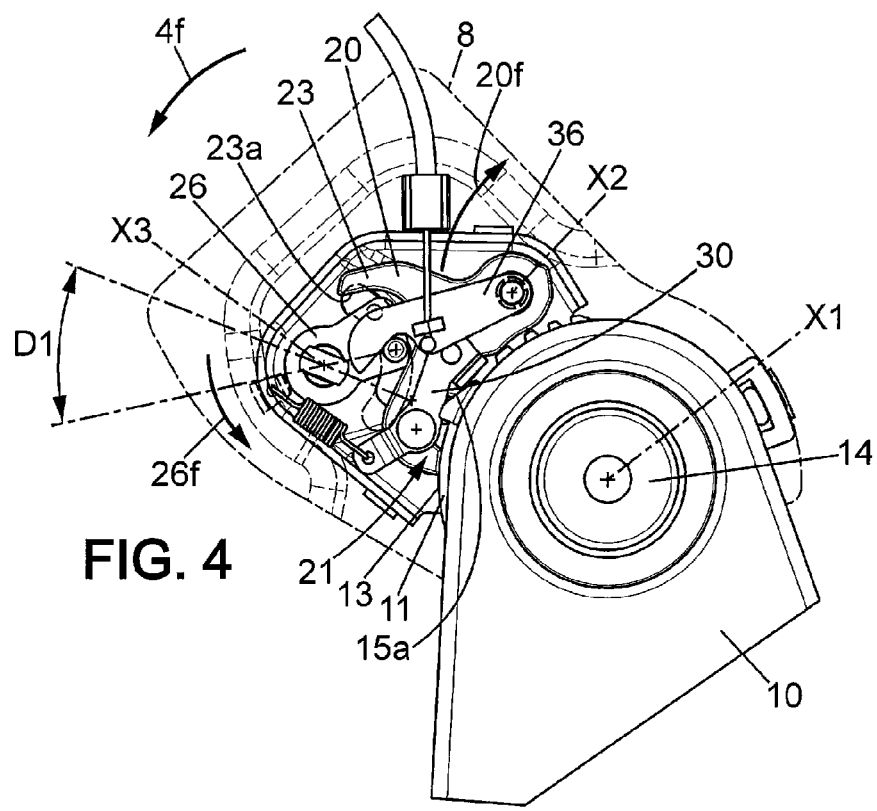

After rotating for a first angular movement portion D1 represented in FIG. 4, the control device 26 interferes with a cam surface 23a of an unlocking pin 23 that is part of the first lock 20, causing the first lock 20 to pivot in the direction of the arrow 20f until the teeth 21a, 21b and 21c are disengaged from the notches 12a, 12b and 12c, allowing a pivoting of the first frame 8 relative to the third frame 11, meaning of the backrest 4 relative to the seat base 2.

When the first lock 20 is unlocked, the backrest 4 can be tilted forward in the direction of the arrow 4f in FIG. 1, in particular to access the space behind the seat 1 as explained above.

FIG. 4 corresponds to the beginning of this pivoting, in a position where the control lever 6 is released by the user, and the spring 27 brings the first control device 26 back into contact with the supporting edge 22 of the first lock 20 and the lock 20 is resting on a circular portion 13 of the edge of the third frame 11 positioned before the notches 12.

During this movement, the teeth 21 of the first lock 20 are facing a circular portion of the edge of the third frame 11, such that the first lock 20 remains in the unlocked position and can slide on this cylindrical surface 13 in a forward pivoting motion.

When the user straightens the backrest 4, the teeth 21 again slide over the circular portion of the third frame until the first frame 8 is in a position where the teeth 21 are facing the notches 12, which is the usage position of the backrest. The first lock 20 is then returned to the locked position by the force of the spring 27 and once again immobilizes the first frame 8 relative to the third frame 11.

As represented in FIGS. 2 to 8, the first and second frames 8, 10 are also connected to each other by a second locking mechanism 17 adapted to selectively affix these two frames together in the tilted position or to allow relative pivoting between these two frames on the pivot axis X1 from the tilted position to the usage position.

The second locking mechanism 17 may comprise a second lock 30 in the form of a plate cut from sheet metal, parallel to the frames 8, 10 and extending between two ends 30a, 30b on each side of an axis of rotation X4 parallel to the axis X1.

The second lock 30 may for example be mounted on the first frame 8 so as to pivot on the axis of rotation X4 by means of a pivot pin 30c passing through said first frame 8.

The second lock 30 is forced by a spring 33 into a rest position in which it is contracted. The spring may be a coil spring extending between an end fixed to the first end of the lock 30a and an opposite end fixed to the first frame 8.

Between the axis X4 and the second end 30b, the second lock 30 comprises a stop element 31 in the form for example of a portion of the sheet folded into a plane perpendicular to the plane of the first hinge 8 and projecting in the direction of the second frame 10. The stop element 31 is adapted to butt up against a stop 15 formed by a radial projection relative to the axis X1 of said first frame 8. The contact between the stop element 31 and the stop 15 occurs in a position substantially corresponding to the forward tilted position of the backrest 4 of the seat.

At its second end 30b, the second lock 30 comprises a hook 32 intended to cooperate with a third lever 38 of a second control device 36.

The second lock 30 is normally held in a lowered position by the spring 33, meaning in a locked state.

A second control device 36 is mounted so as to pivot on an axis of rotation parallel to the axis X2, said axis of rotation possibly being, as represented in the figures, the axis X2 already used for the first lock 20.

The second control device 36 extends between a first end 36a comprising said axis of rotation and a second end 36b in the form of a hook 39 directed towards a second lever 29 of the first control device 26.

The second control device 36 extends in a plane adjacent to the plane of the second lock 30.

Between these two ends 36a and 36b, the second control device 36 comprises a third lever 38 extending transversely relative to the plane of said second control device and in the direction of the plane of the second lock 30. The third lever 38 is engaged in the hook 32 of the second lock 30, so that force is exerted on it in a direction opposite that of the arrow 36f, towards the second frame 10.

The hook 39 is adapted to cooperate with a second lever 29 of the first control device 26, such that a second movement portion D2 of said first control device 26 can cause the second control device 36 to pivot in the direction of the arrow 36f the moment the second lever 29 comes in contact with the hook 39 of the second control device 36. The second lock 30 is then pivoted from its locking position to an unlocking position, to release the first frame 8 from its tilted position and allow it to rotate towards the usage position.

In a first variant, the first frame 8 comprises an opening 8a in the form of a circular portion centered on the axis X3 of the first control device 26, said opening 8a being traversed by the second lever 29 in order to cooperate with the hook 39 of the second control device 36. The first control device 26 actuated by the first cable 6a can thus actuate the second control device 36 to unlock the second lock 30, when said first control device 26 is pivoted in the second movement portion D2 following the first movement portion D1, from the initial locking position of said second lock 30.

In a second variant, the second control device 36 may comprise a fastening means 37 for attaching an end of a second cable 6b, so that the second control device 36 can be directly pivoted in the direction of the arrow 36f.

The second cable 6b may also be connected to the control lever 6 of the backrest, or to any other element having a movement which can be adapted for controlling the unlocking of the second lock 30. Its length should then be adapted, for example, to actuate the second control device 36 for a displacement of the control lever 6 that is equivalent to the second movement portion D2.

The third lever 38 cooperates with the hook 32 of the second lock 30, to pivot the second lock 30 in the direction of the arrow 30f from its locking position to an unlocking position, and to release the first frame 8 from its tilted position and allow it to rotate towards the usage position.

Because of the arrangements in these two variants, the second lock 30 can be unlocked with no need to use another lever dedicated to said second lock 30.

In addition, the first and second locks 20, 30, and their respective control devices 26, 36, are housed in the first frame 8 above the hinge mechanism 14, in an upper portion of the first frame 8.

These first and second locking mechanisms 16, 17 are also thin in the direction of the first axis X1, for example less than 10 mm. The hinge assembly thus requires little space. It is adaptable to almost any backrest and seat base structure, with no modification to said structures.

The operation of the hinge assembly 7 of this first embodiment of the invention is now explained in more detail, with reference to FIGS. 3 to 8.

Figure 3:
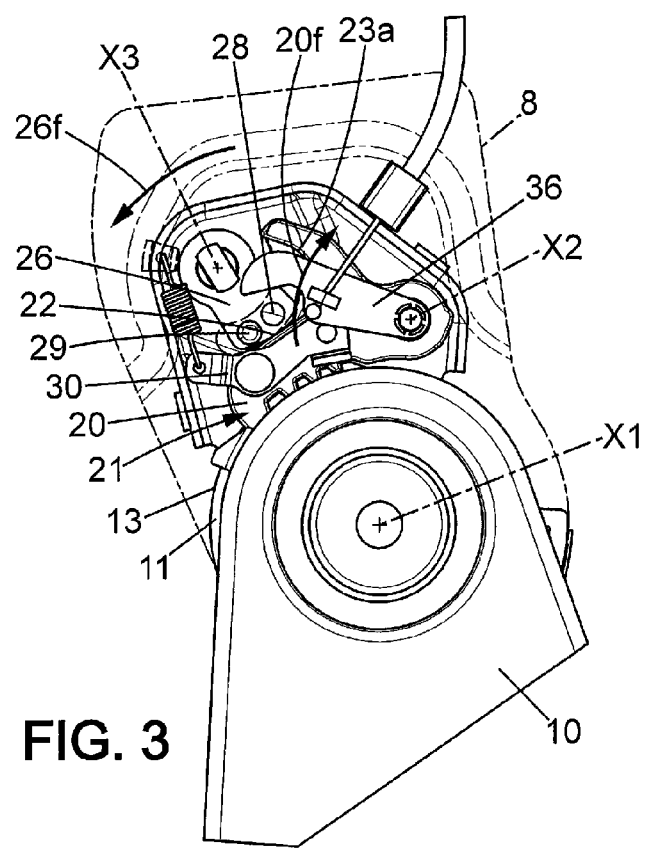
Figure 2:
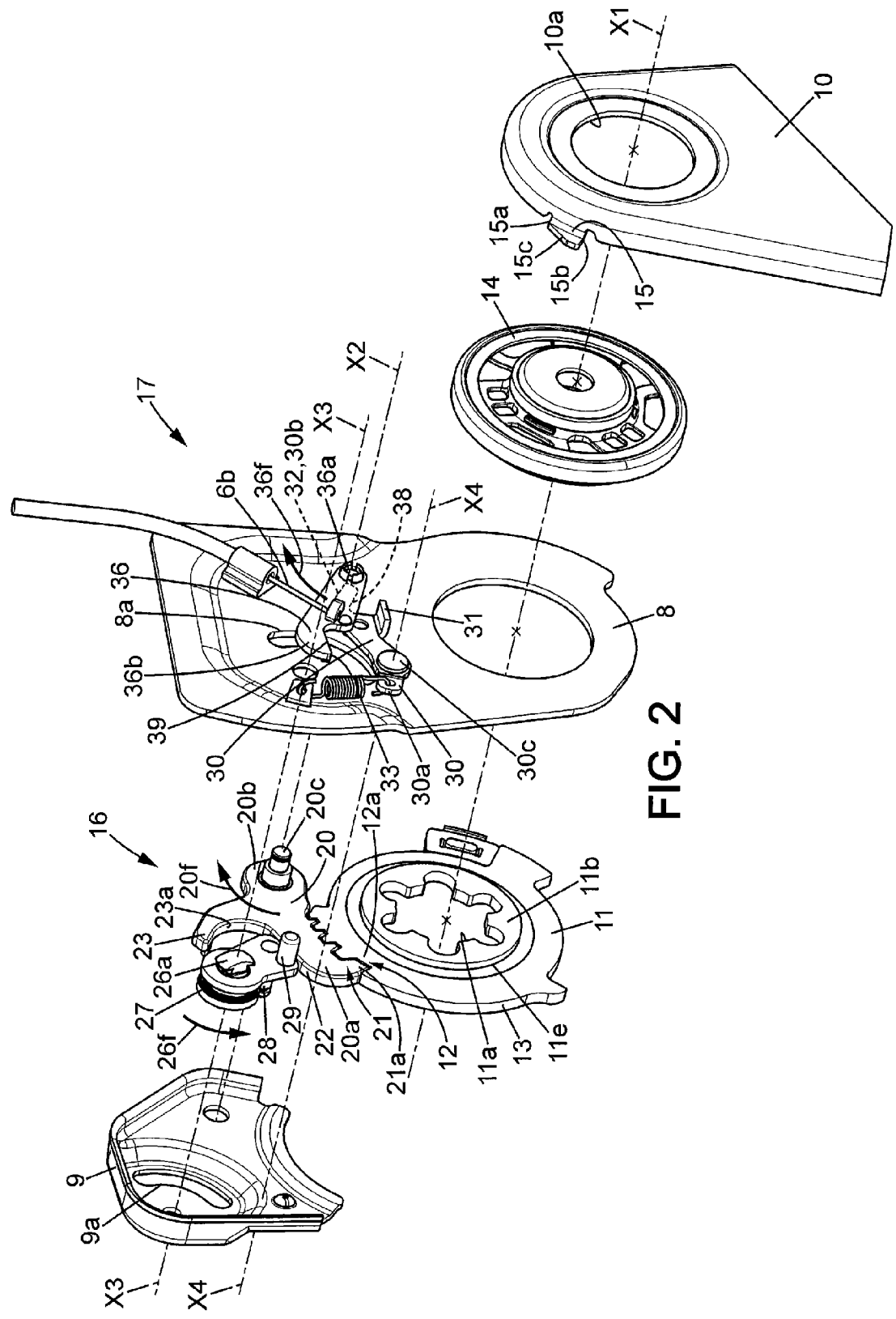
FIG. 2 is an exploded perspective view of a hinge assembly according to a first embodiment, which can be equipped in the seat in FIG. 1, FIGS. 3 to 8 are side views of the assembly of FIG. 2, in which the first frame is represented with dotted lines to provide a better view of the elements of the assembly, the elements of the assembly being in different positions to show the movement and interactions between these elements.

In FIG. 3, the first frame 8 connected to the backrest 4 is in the usage position. The teeth 21 of the first lock 20 are engaged in the notches 12 of the third frame 11, preventing any pivoting or rotation of the first frame 8 relative to the third frame 11.

The user actuates the control lever 6 to tilt the seat. This lever pulls on the first cable 6a connected to the first lever 28, causing the first control device 26 to pivot in the direction of the arrow 26f.

The first control device 26 comes into contact with the cam surface 23a and pushes the locking pin 23 of the lock 20, which pivots in the direction of the arrow 20f and disengages the teeth 21 from the notches 12 to unlock the first lock 20 from the third frame 11. The first frame 8 is then unlocked from its usage position and the user can begin to tilt the backrest 4 forward.

Once the user releases his pressure on the control lever 6, the spring 27 forces the first lock 20 into contact with the circular portion 13 of the third frame 11 (FIG. 4).

As the seat tilts forward, the teeth 21 of the first lock 20 slide on this circular portion 13, and the second lock 30 remains in the lowered position, until its stop element 31 comes into contact with a first angled surface 15a of the stop 15.

Figure 5:
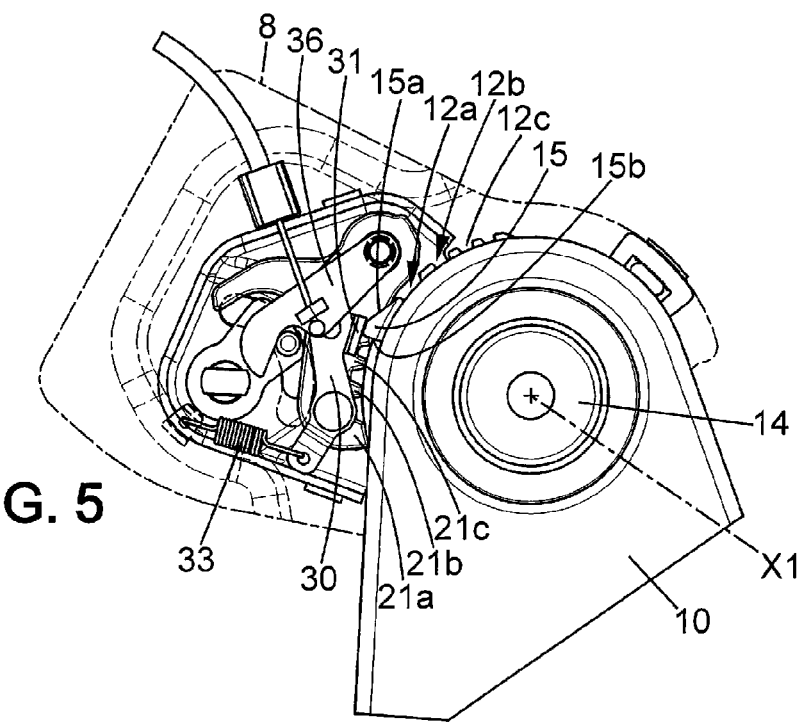

From the action of tilting the first surface 15a, the second lock 30 slides on said first surface 15a and is lifted by stretching the spring 33 until it reaches a peripheral portion 15c of this stop 15 (FIG. 5).

Figure 6:
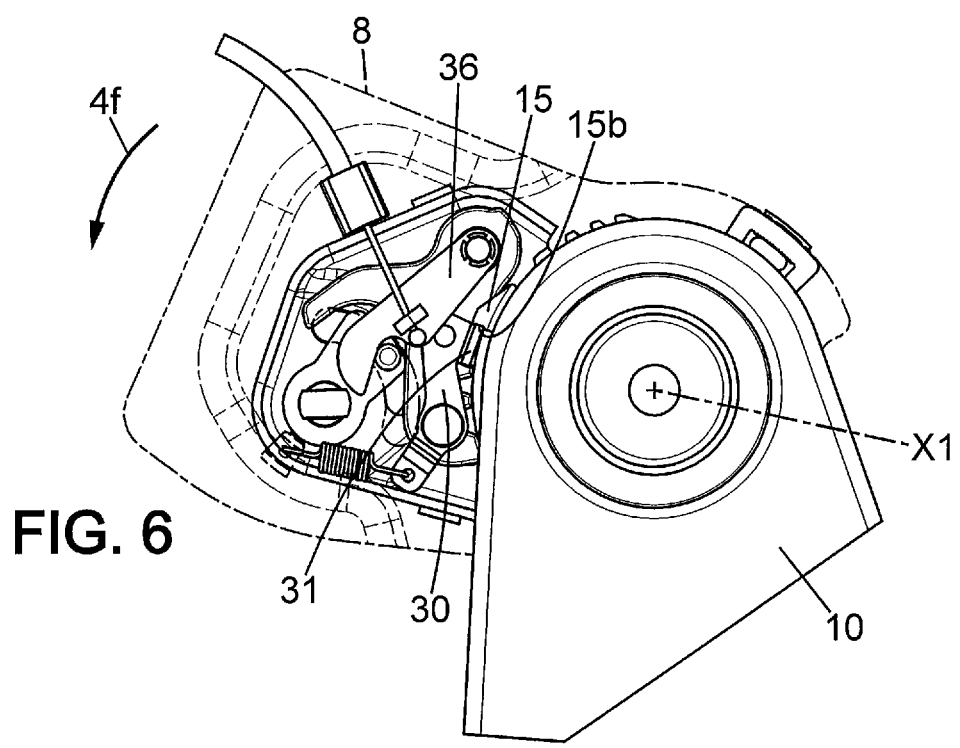
Figure 7:
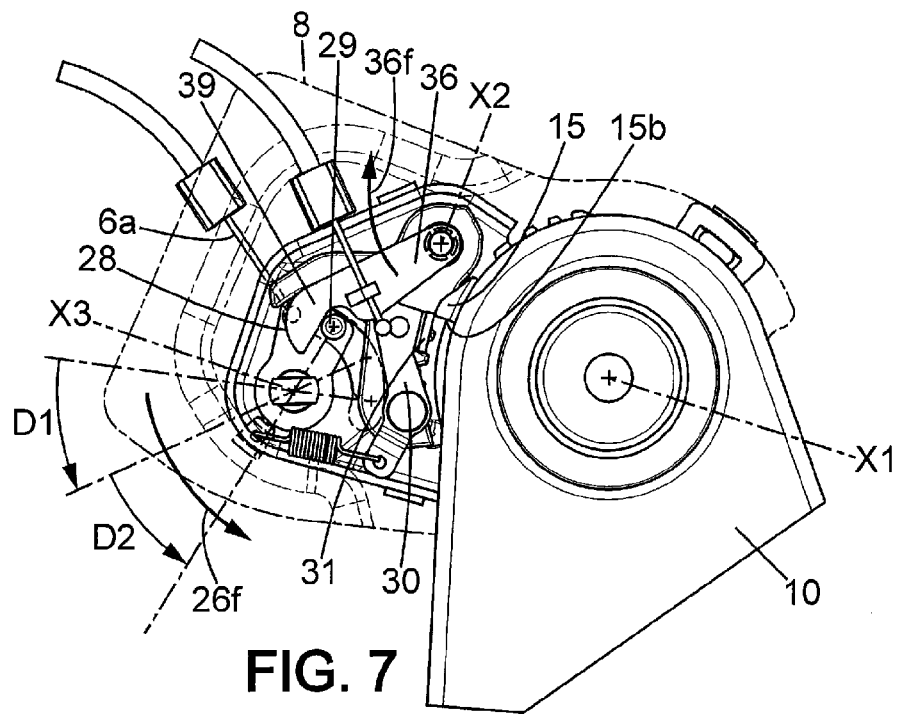
Figure 8:
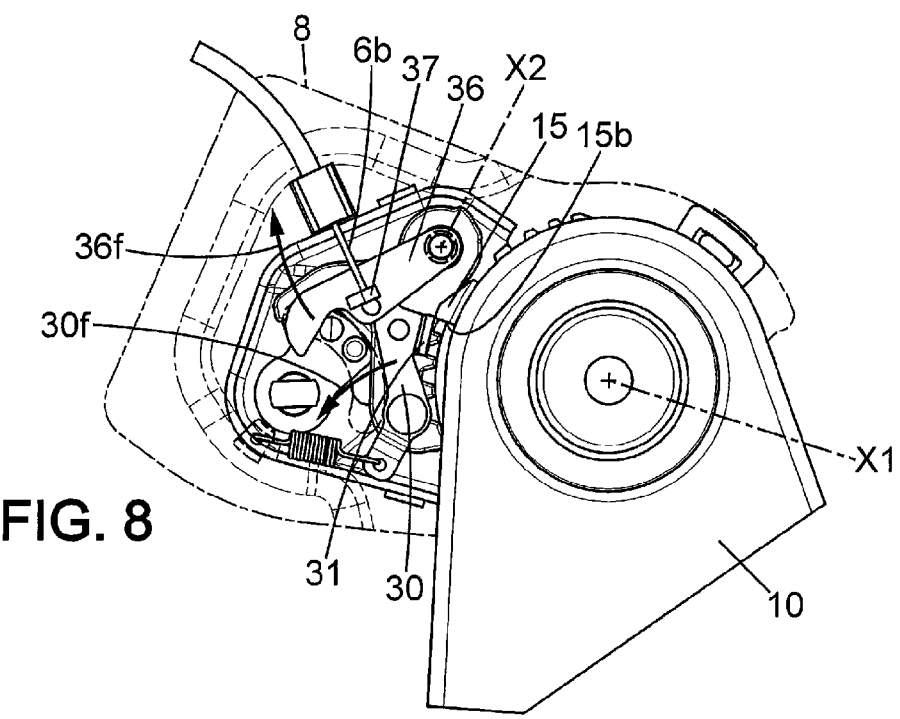

Once the forward tilt of the first frame 8 exceeds a limit angular position, corresponding to the stop element 31 moving beyond a second surface 15b of the stop, said second surface 15b extending substantially radially relative to the axis X1, the second lock 30 is lowered by the force of the spring 33 (FIG. 6). The second lock 30 then enters the locked position and immobilizes the first frame 8 relative to the second frame 10.

The second lock 30 is then unlocked by the user who reactivates the control lever 6 to raise the backrest.

In a first variant (FIG. 7), the first cable 6a is pulled over a longer distance, and the first control device 26 pivots in the direction of the arrow 26f and over the first and second angular movement portions D1, D2 due to the action of said first cable 6a on the first lever 28.

In the second displacement portion D2, the second lever 29 comes into contact with the hook 39 of the second control device 36 which pivots in the direction of the arrow 36f and rotates the second lock 30 in the direction of the arrow 30f by means of its third lever 38, until said second lock 30 is unlocked by raising its stop element 31 above the edge of the stop 15.

The first frame 8 can then tilt backwards, sliding over the circular portion 13 to its usage position, where it is again locked in place by the action of the spring 27 on the first lock 20 which engages the teeth 21 in the notches 12 of the third frame 11.

In the second variant (FIG. 8), the second cable 6b directly pivots the second control device 36 in the direction of the arrow 36f by means of the fastening element 37 when the user actuates the control level 6 in a second movement portion. The second control device 36 then rotates the second lock 30 in the direction of the arrow 30f as already explained in the first variant, to unlock the second lock 30.

The backrest 4 can then be tilted back and be relocked by the first lock 20 in the usage position.

FIGS. 9 to 16 show a second embodiment of a pivoting hinge assembly 7 according to the invention, adapted to equip the seat 1 of FIG. 1. Represented in the usage position in the side view in FIG. 10 and in the exploded perspective view in FIG. 9, this hinge assembly 7 comprises elements similar to the first embodiment of the invention.

In particular, this hinge assembly 7 also comprises:
- first, second, and third frames 8, 10, 11, the first frame 8 being part of the frame of the backrest, the second frame 10 being part of the frame of the seat base,
- a cover plate 9, for covering the first frame 8,
- a hinge mechanism 14 connecting the second 10 to the third frame 11 to adjust an angular usage position of the backrest relative to the seat base, and
- a first locking mechanism 16 for locking and unlocking the first frame 8 relative to the third frame 11 in the usage position, and
- a second locking mechanism 17 for locking and unlocking the first frame 8 relative to the second frame 10 in a tilted position.

The first locking mechanism 16 may be identical to the one of the first embodiment, as represented in the figures, and it will not be described again here.

The second locking mechanism 17 differs from that of the first embodiment of the invention.

The second locking mechanism 17 also comprises a second lock 30 adapted to cooperate with a stop 15 that is part of the second frame 10, and a second control device 36 adapted to cause the locking state of the lock 30 to change.

The stop 15 of the second frame 10 comprises a first surface 15a and a second surface 15b, which come together at the peripheral section 15c that is furthest from the axis X1. In this embodiment, said peripheral section 15c is shaped as a narrow tip extending radially from the axis X1, and the first and second surfaces 15a and 15b extend at an angle to each side of this portion 15c.

The second surface 15b is angled by an angle α (FIG. 14) relative to a radial direction.

The second lock 30 comprises a stop element 31 adapted to cooperate by butting up against the second surface 15b of the stop 15 at a first contact point P1. In this embodiment, however, this first contact point P1 is not sufficient to lock the second lock 30 in the locking position represented in FIG. 14.

A first reaction direction is perpendicular to the second surface 15b at the first contact point P1: it corresponds to the direction of a first reaction force $F_{R1}$ of the stop 15 against the second lock 30 at the first contact point P1. The lock direction passes through the locking member 31 and the axis X4. The second surface 15b and the lock direction form an angle β. The first reaction direction and the lock direction then form an angle γ, such that γ=90°−β.

If this angle γ is constructed to be less than a limit angle ε, depending on the friction properties of the materials and the surface conditions of the parts that are in contact, for example equal to 11.3°, then the locking member 31 does not slide on the second surface 15b of the stop. The second lock 30 then remains locked because of the friction at the first contact point P1 between the second surface 15b and the stop element 31.

If this angle γ is constructed to be greater than the limit angle ε, then the locking member 31 can slide on the second surface 15b because the friction between said parts is insufficient to stop the movement of the second lock 30.

In the case of the second embodiment, this angle γ is greater than the limit angle ε, such that the contact between the locking member 31 of the second lock 30 is not sufficient to lock it. The second lock 30 therefore reversibly cooperates with the stop 15.

As can more easily be seen in FIG. 9a, and in the other figures as a dotted line, the second lock 30 then additionally comprises a stop portion 34, and the second control device 36 comprises an end stop 36d, said stop portion 34 and said end stop 36d being adapted to also be in contact in the locking position of the second lock 30, to lock the second lock 30 irreversibly in this locking position corresponding to the tilted position of the first frame 8.

The second lock 30 extends between a first end 30a and a second end 30b. It is mounted so as to pivot on a pivot pin 30c of axis X4 situated between said ends. It comprises a stop element 31 in the form of a pin located between the pivot pin 30c and the second end 30b. The stop portion 34 thus extends from the locking member 31 to the second end 30b, in the shape of a tooth substantially oriented radially outwards, opposite the axis X1 and in the direction of the end stop 36d of the second control device 36.

The end stop 36d is positioned between the first end 36a corresponding to the axis X2 and the second end 36b of the second control device 36. It runs transverse to a central plane of the second control device 36, extending towards the second lock 30 so as to interfere with a transverse cam surface of the stop portion 34, said cam surface extending between a first side 30c facing the axis X2 and a second side 30d opposite the first side, with a distanced portion 30e connecting the first and second sides at the second end 30b of the second lock 30.

Figure 14:
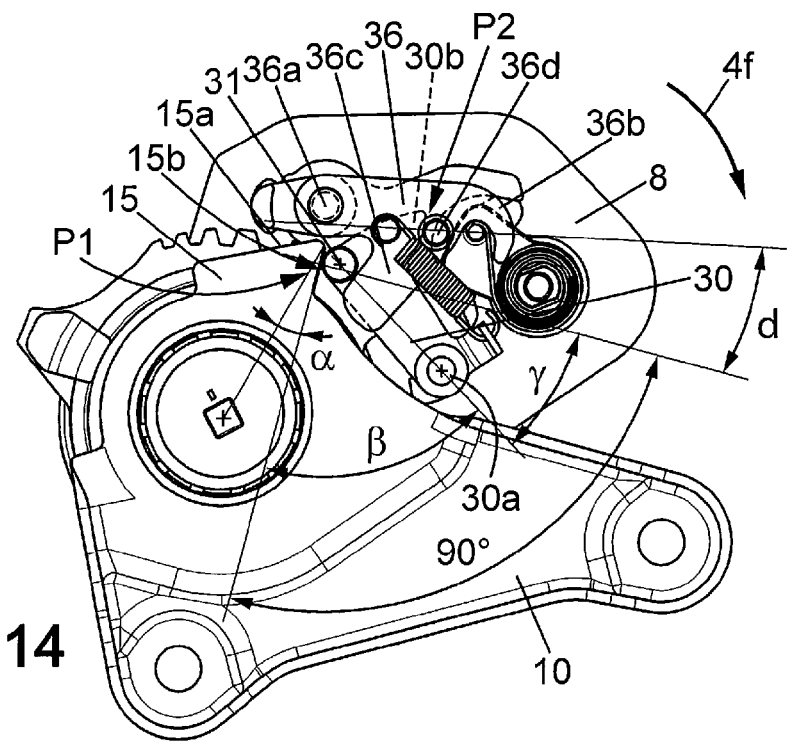
FIG. 14 is another side view of the assembly of FIG. 9, in which the first frame is represented with dotted lines to provide a better view of the elements of the assembly, the elements of the assembly being in different positions to show the movement and interactions between these elements and shows the locked position of a second lock.

The second lock 30 is locked in the position in FIG. 14, a position in which the end stop 36d of the second control device 36 interferes with a second contact point P2 of the second side 30d of the cam surface of the second lock 30.

A second reaction force $F_{R2}$ of the second control device against the second lock 30 at the second contact point P2 is substantially perpendicular to the cam surface at said second contact point P2. The direction of this second reaction force is a second reaction direction which forms an angle δ with the first reaction direction.

The angle δ depends on the angle of the second surface 15b of the stop at the first contact point P1 and the angle of the second side 30d of the cam surface of the second lock 30 at the second contact point P2, taken in the locking position of FIG. 14.

The second lock 30 can be unlocked by supplying the second control device 36 with an unlocking force Fd corresponding to a force which enables movement of the end stop 36d over the cam surface. This unlocking force must therefore be greater than or equal to the second reaction force F2 multiplied by the tangent of a limit angle ε which is dependent on the friction properties of the materials and the surface conditions of the parts in contact:

$$Fd = F2 \cdot \tan(\epsilon)$$

The unlocking force Fd is weak because the limit angle ε is small. This limit angle ε is for example between 5.7° and 16.7°, and preferably 11.3°. Its tangent is then between 0.1 and 0.3, and preferably 0.2.

The unlocking force Fd is also weak because the second reaction force F2 is weak.

Figure 14A:
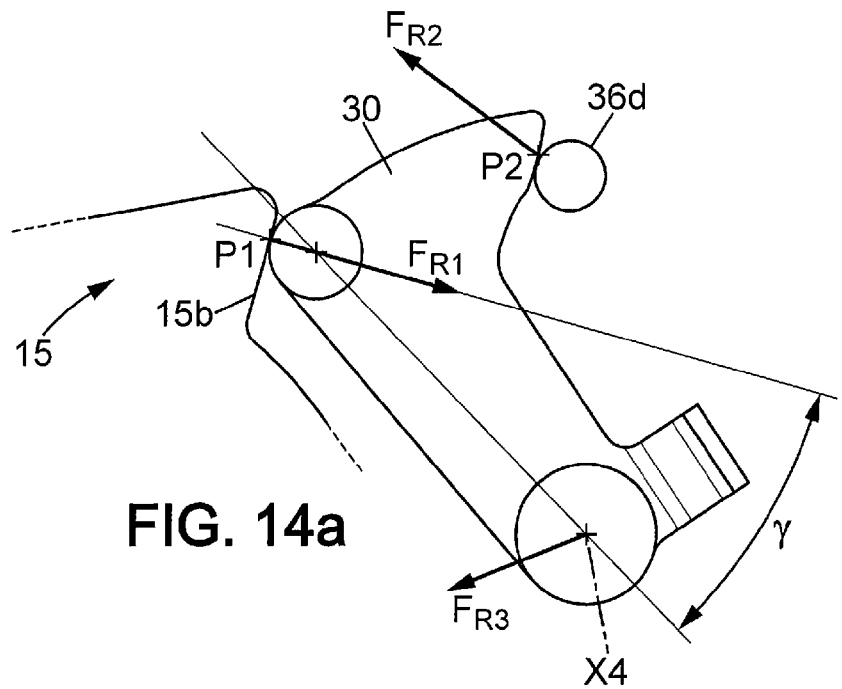
FIG. 14a is an enlarged view of FIG. 14, showing the forces between the parts which act to immobilize the second lock
Figure 15:
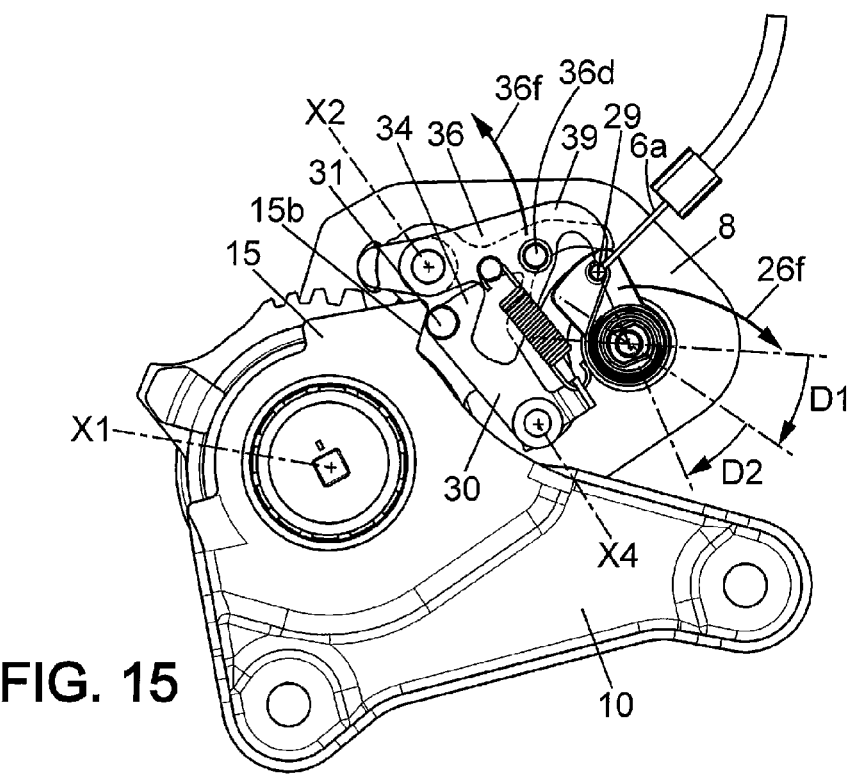
FIG. 15 is another side view of the assembly of FIG. 9, in which the first frame is represented with dotted lines to provide a better view of the elements of the assembly, the elements of the assembly being in different positions to show the movement and interactions between these elements.
Figure 16:
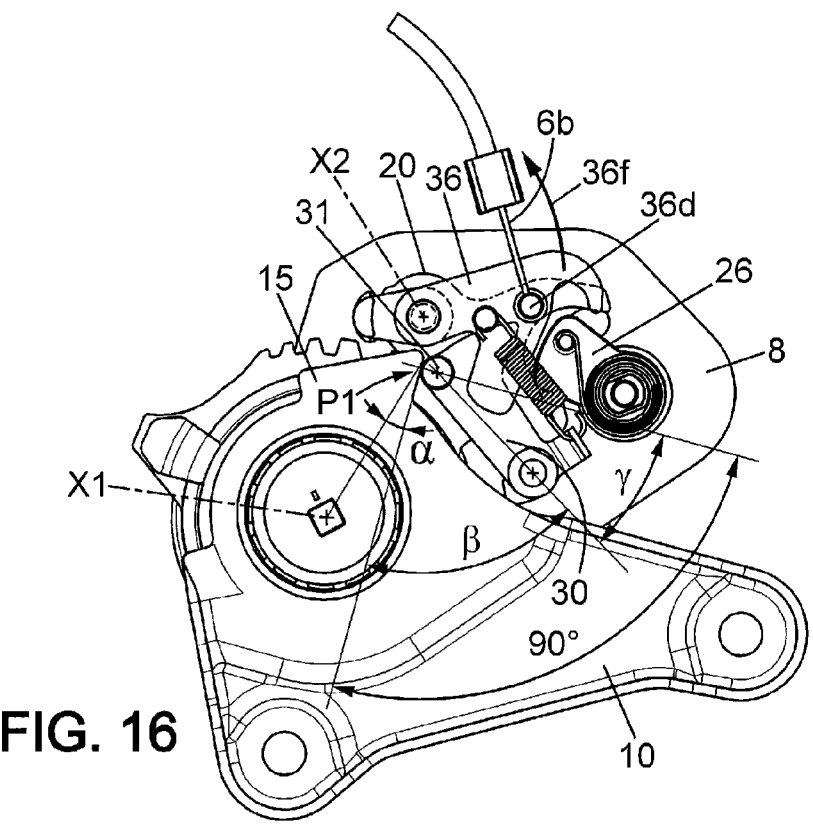
FIG. 16 is another side view of the assembly of FIG. 9, in which the first frame is represented with dotted lines to provide a better view of the elements of the assembly, the elements of the assembly being in different positions to show the movement and interactions between these elements.

The mechanical equilibrium of the second lock 30 is composed of the first and second reaction forces plus a third reaction force $F_{R3}$ from the first frame 8 on the axis of rotation X2 of the second lock 30 (FIG. 14a).

When the value of the angle γ is small, the first and third reaction forces are almost equal in value and opposite in direction, such that the second reaction force becomes very weak. As a result, by constructing a second locking device 17 so that the angle γ (angle between the first reaction direction and the lock direction) is low, the unlocking force Fd for the second lock 30 is thus reduced.

If the angle γ becomes less than the limit angle ε (from the friction from the contact between the parts), the second reaction force would be zero, but the locking would be irreversible.

The angle γ is thus greater than the limit angle ε, without being too large to limit the value of the unlocking force Fd. It is therefore of particular interest to construct a second locking mechanism 17 such that the angle γ is between ε and ε+10°; for example between 11.3° and 21.3°.

Preferably, the angle γ is between ε and ε+5°; for example between 11.3° and 16.3°. The value of the unlocking force Fd is thus reduced.

By these arrangements, the value of the unlocking force Fd required to unlock the second lock 30, when the user moves the first frame 8 from the tilted position to the usage position, is reduced. In addition it is easily adjustable due to the geometric construction of the parts of the second locking device 17.

In addition, the components and element of the first and second locking mechanisms 16, 17 are between the first frame 8 and the cover plate 9, and/or on one of their sides. This hinge assembly 7 also requires little space, and is adaptable to almost any seat structure without modification to the frames of the backrest or seat base, and without difficulties in accommodating the control cables.

The operation of the hinge assembly 7 of this second embodiment of the invention is now explained more specifically with references to FIGS. 9 to 16.

Figure 10:
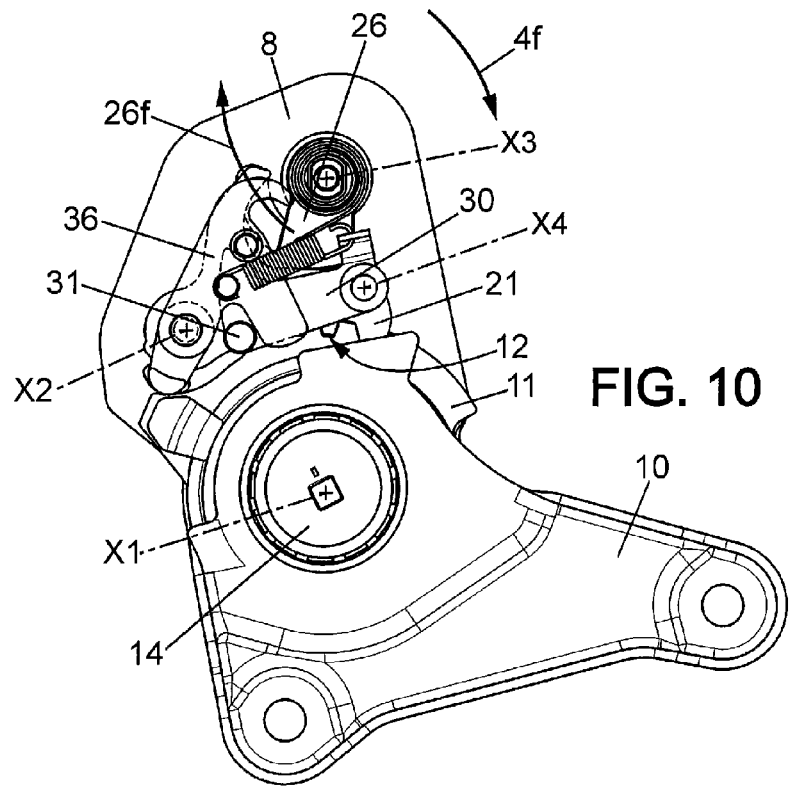
FIG. 10 is a side view of the assembly of FIG. 9, in which the first frame is represented with dotted lines to provide a better view of the elements of the assembly, the elements of the assembly being in different positions to show the movement and interactions between these elements.

In FIG. 10, the first frame 8 connected to the backrest is in the usage position, the teeth 21 of the first lock 20 being engaged in the notches 12 of the third frame 11 to immobilize the first frame relative to the third frame.

The user actuates the control lever 6 to tilt the seat forward. This causes the first control device 26 to pivot in direction 26f, which acts on the first lock 20 as described in the first embodiment to disengage the teeth 21 and unlock the first lock 20.

Figure 11:
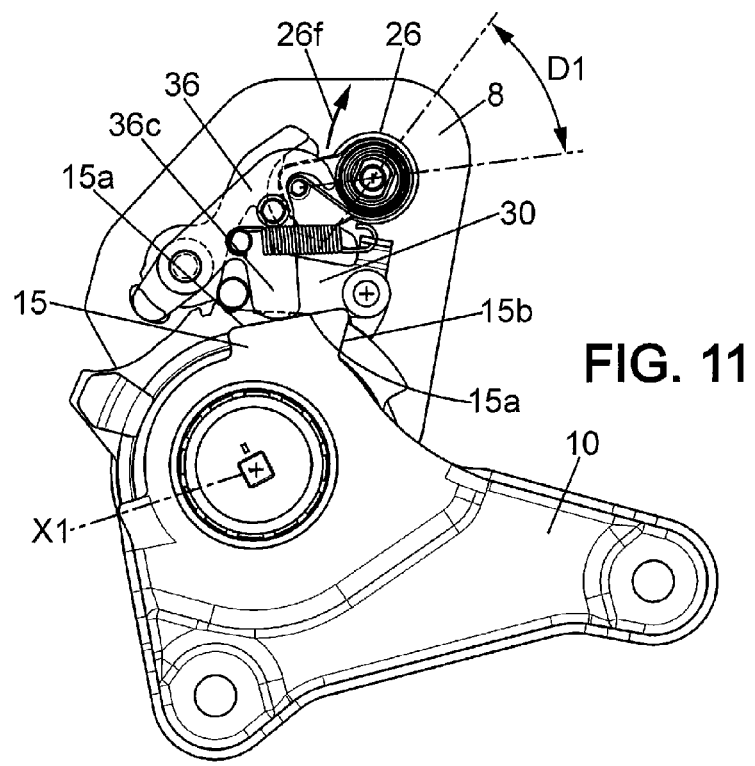
FIG. 11 is another side view of the assembly of FIG. 9, in which the first frame is represented with dotted lines to provide a better view of the elements of the assembly, the elements of the assembly being in different positions to show the movement and interactions between these elements.

The first frame 8 can then tilt forward as represented in a first intermediate step in FIG. 11.

The second control device 36 comprises a foot 36c which extends towards the second frame 10. This foot 36c is adapted to slide on the first surface 15a of the stop 15 during the tilting motion. This element allows the second control device 36 to remain in a raised position and the user does not need to keep pulling on the control lever 6 at the top of the backrest. He can release the lever while moving the seat towards the forward tilted position.

The locking member 31 of the second stop 30 is also adapted to slide on this first surface 15a during the forward tilting motion, which successively brings the foot 36c and the locking member 31 towards the second surface 15b of the stop 15 to lock the second lock 30 in place (FIG. 12).

During this tilting motion, the control member 31 reaches the peripheral portion 15c before lowering onto the second surface 15b. In this position of FIG. 13, the second lock 30 is raised by its locking member 31 pressing against the peripheral portion 15c of the stop, and the second control device 36 is also raised by its end stop 36d pressing against the first side 30c of the stop portion 34 of the second lock 30.

Figure 9:
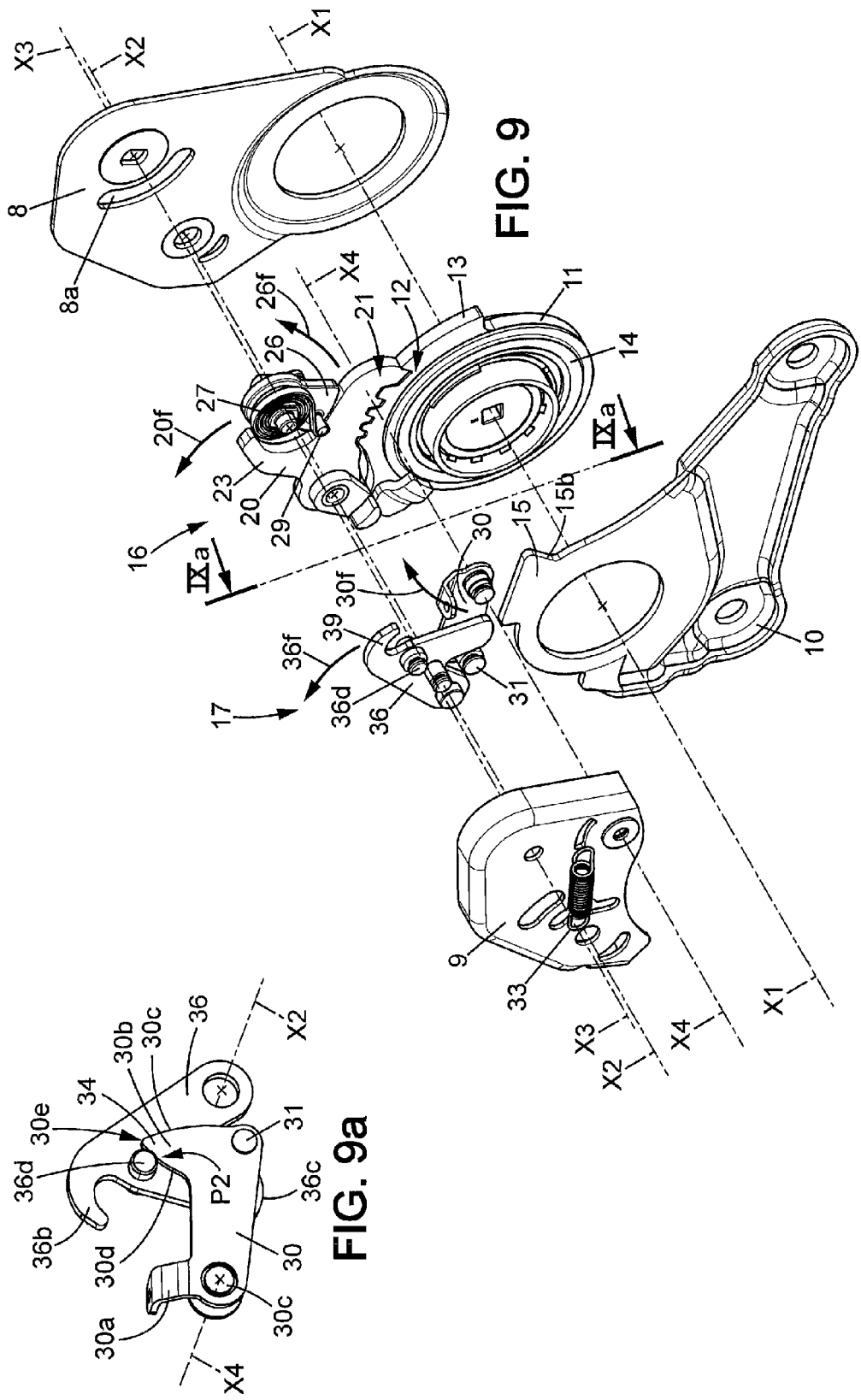
FIG. 9 is an exploded perspective view of a hinge assembly according to a second embodiment, which can be equipped in the seat of FIG. 1.

When the locking means 31 passes beyond the peripheral portion 15c, it lowers onto the second surface 15b of the stop 15, in a pivoting movement of the second lock 30 which is the inverse direction to the arrow 30f (FIG. 9). The second lock 30 thus reaches the locking position of FIG. 14, corresponding to the locked tilted position of the first frame 8.

In this last movement, the end stop 36d of the second control device 36 tilts from the first side 30c of the stop portion 34 towards the second side 30d of the stop portion 34, to lock the second lock 30 in this locking position in a manner that is irreversible without external action, as explained above for the value of the angle γ.

On the one hand, this angle γ must have a value greater than a limit angle value ε so that locking the second lock 30 is reversible and unlockable, after it is locked by the second control device 36. On the other hand, if the angle γ has too large a value, the angle δ will be larger and the unlocking force will be greater. As a result, this angle γ assumes a value of between ε and ε+10° for example, corresponding to a compromise between reversible locking and a low unlocking force when controlling the second control device 36. Preferably, this angle γ has a value of between ε and ε+5°.

The second lock 30 can then be unlocked by the user who reactivates the control lever 6 to raise the seat.

In the first variant of the unlocking (FIG. 15), the first cable 6a is pulled for a distance adapted to pivot the first control device 26 in the direction of the arrow 26f in an angular displacement corresponding to a first movement portion D1 and a second movement portion D2.

The second lever 29 of the first control device 26 interferes with the hook 39 of the second control device 36, and causes it to pivot in the direction of the arrow 36f.

The user can then move the backrest (the first frame 8) towards the usage position. The locking member 31 is released and can slide on the second surface 15b of the stop 15, sloped by an angle α, then on the first surface 15a of the stop before resuming its initial position in FIG. 10.

In a second variant of the unlocking (FIG. 16), the second cable 6b directly actuates the second control device 36 to pivot it in direction 36f for a sufficient distance for the end stop 36d to be moved away from the second lock 30.

The user can then move the backrest (the first frame 8) towards the usage position. The locking member 31 is released and can slide on the second surface 15b of the stop 15, sloped by an angle α.

Through these arrangements for the second lock 30 of the second embodiment of the invention, unlocking the second lock 30 requires less force than that of the first embodiment. The evolution of this unlocking force over time is below a threshold force value that is smaller. Manipulating the backrest is easier and continuous in its return motion towards the usage position. The operation is therefore more pleasant for the user.

The invention claimed is:

1. A hinge assembly for a vehicle seat, comprising:
   first, second, and third frames assembled to pivot relative to each other on a first axis,
   a hinge mechanism connecting the second and third frames, said hinge mechanism being adapted to adjust an angular usage position of the second frame relative to the third frame,
   a first lock assembled on the first frame to move between a locked position, in which said first lock immobilizes the first frame relative to the third frame in said usage position, and an unlocked position, in which said first lock allows the first frame to pivot relative to the third frame,
   a first control device adapted to move the first lock between the locked position and said unlocked position,
   a second lock assembled on the first frame to move between a locked position, in which said second lock immobilizes the first frame relative to the second frame in a forward tilted position, by contact between a stop that is part of the second frame and a stop element that is part of the second lock, and an unlocked position, in which said second lock allows the first frame to pivot relative to the second frame, the stop comprising a first surface adapted to come into contact with the stop element when the first frame is moved from the usage position to the forward tilted position, the first surface being angled relative to a radial direction from the first axis in order to raise the second lock above the stop during the movement into the tilted position, the stop being adapted to immobilize the second lock in the locking position when the first frame is in the tilted position, the stop further comprises a second surface adapted to come into contact with the stop element at a first contact point, to immobilize the second lock in the locking position when the first frame is in the tilted position, and the second lock further including a stop portion extending radially outward relative to the first axis,
   a second control device adapted to move the second lock between said locked position and said unlocked position, the second control device comprising an end stop adapted to cooperate with the stop portion by contact at a second point between the end stop and the stop portion, the end stop being adapted to immobilize the second lock in the locking position when the first frame is in the tilted position, and
   the first control device being adapted to cooperate with the first lock, over a first movement portion of the first control device starting from the initial locking position of said first control device, to unlock the first lock, and the second control device, over a second movement portion following said first movement portion, to unlock the second lock.

2. The assembly according to claim 1, wherein the first and second locks and the first and second control devices are adjacent to an upper portion of the first frame, said upper portion extending substantially along a central plane perpendicular to the first axis and out to a distance from said first axis that is greater than the outside diameter of the hinge mechanism.

3. The assembly according to claim 1, wherein the first and second locks and the first and second control devices do not extend more than 10 mm in the direction of the first axis relative to said central plane.

4. The assembly according to claim 1, wherein the second surface of the stop extends in a radial direction from the first axis to immobilize the second lock in the locking position when the first frame is in the tilted position.

5. The assembly according to claim 1, wherein, in the locking position, a first reaction direction perpendicular to the second surface at the first contact point between the stop and the second lock, and a lock direction extending between the stop element and an axis of rotation of the second lock, form an angle greater than a limit angle, said limit angle corresponding to an angle of friction between the second lock and the second control device.

6. The assembly according to claim 5, wherein said angle between the first reaction direction and the lock direction is less than an other limit angle, said other limit angle being less than the limit angle plus 10 degrees.

7. A vehicle seat comprising a seat base and a backrest, connected to each other by at least one hinge assembly according to any one of the above claims, one of the first and second frames being connected to the backrest and the other to the seat base.

8. The assembly according to claim 6, wherein the other limit angle is less than the limit angle plus 5 degrees.

* * * * *